(12) United States Patent
Yelin et al.

(10) Patent No.: US 8,804,133 B2
(45) Date of Patent: Aug. 12, 2014

(54) METHOD AND SYSTEM OF ADJUSTING A FIELD OF VIEW OF AN INTERFEROMETRIC IMAGING DEVICE

(75) Inventors: Dvir Yelin, Haifa (IL); Michal Merman, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 796 days.

(21) Appl. No.: 12/816,394

(22) Filed: Jun. 16, 2010

(65) Prior Publication Data

US 2010/0315652 A1 Dec. 16, 2010

Related U.S. Application Data

(60) Provisional application No. 61/187,293, filed on Jun. 16, 2009.

(51) Int. Cl.
*G01B 9/02* (2006.01)
(52) U.S. Cl.
USPC .......................................... 356/521; 356/456
(58) Field of Classification Search
USPC ................. 356/521, 456, 477, 494, 499
See application file for complete search history.

(56) References Cited

U.S. PATENT DOCUMENTS

| | | | |
|---|---|---|---|
| 5,293,872 A | 3/1994 | Alfano et al. | |
| 5,434,669 A | 7/1995 | Tabata et al. | |
| 5,441,053 A | 8/1995 | Lodder et al. | |
| 5,713,364 A | 2/1998 | DeBaryshe et al. | |
| 6,110,106 A | 8/2000 | MacKinnon et al. | |
| 6,421,164 B2 * | 7/2002 | Tearney et al. | ............... 359/287 |
| 6,564,088 B1 | 5/2003 | Soller et al. | |
| 6,615,071 B1 | 9/2003 | Casscells, III et al. | |
| 6,816,743 B2 | 11/2004 | Moreno et al. | |
| 7,267,648 B2 | 9/2007 | Hasegawa | |
| 7,570,988 B2 | 8/2009 | Ramanujam et al. | |
| 7,809,225 B2 | 10/2010 | Bouma et al. | |
| 7,809,226 B2 | 10/2010 | Bouma et al. | |
| 7,925,133 B2 | 4/2011 | Bouma et al. | |
| 2004/0024298 A1 | 2/2004 | Marshik-Geurts et al. | |
| 2004/0210113 A1 | 10/2004 | Hasegawa | |
| 2005/0023356 A1 | 2/2005 | Wiklof et al. | |
| 2007/0076220 A1 | 4/2007 | Kawahara | |
| 2007/0239035 A1 | 10/2007 | Nakabayashi | |
| 2007/0263208 A1 * | 11/2007 | Yelin et al. | .................... 356/307 |
| 2007/0299312 A1 | 12/2007 | Hasegawa | |
| 2008/0004496 A1 | 1/2008 | Hasegawa | |
| 2008/0007716 A1 | 1/2008 | Igarashi | |

(Continued)

OTHER PUBLICATIONS

Official Action Dated Dec. 5, 2012 From the US Patent and Trademark Office Re. U.S. Appl. No. 12/816,395.

(Continued)

*Primary Examiner* — Jonathan Hansen (57) ABSTRACT

A method of imaging at least a part of an object. The method comprises splitting electro-magnetic radiation to first and second portions, propagating the first and second portions, spectrally dispersing the first portion toward the part and the second portion toward a reference element, combining between reflections of the spectrally dispersed first and second portions to produce an interference signal, capturing an image of the part from the interference, and adjusting at least one of a tilt of said image plane and a curvature of the image by changing a deviation between the phase of at least one spectral component of the first portion and the phase of at least one spectral component of the second portion.

16 Claims, 7 Drawing Sheets

(56) References Cited

U.S. PATENT DOCUMENTS

2010/0198081 A1 8/2010 Hanlin et al.
2011/0295541 A1 12/2011 Yu et al.
2011/0313299 A1 12/2011 Brennan, III

OTHER PUBLICATIONS

Official Action Dated Mar. 7, 2012 From the US Patent and Trademark Office Re. U.S. Appl. No. 12/816,395.

Official Action Dated Oct. 23, 2012 From the US Patent and Trademark Office Re. U.S. Appl. No. 12/816,395.

Advisory Action Before the Filing of an Appeal Brief Dated May 22, 2013 From the US Patent and Trademark Office Re. U.S. Appl. No. 12/816,395.

Official Action Dated Sep. 5, 2013 From the US Patent and Trademark Office Re. U.S. Appl. No. 12/816,395.

* cited by examiner

METHOD AND SYSTEM OF ADJUSTING A FIELD OF VIEW OF AN INTERFEROMETRIC IMAGING DEVICE

RELATED APPLICATION

This application claims the benefit of priority under 35 USC 119(e) of U.S. Provisional Patent Application No. 61/187,293 filed Jun. 16, 2009, the contents of which are incorporated by reference as if fully set forth herein.

FIELD AND BACKGROUND OF THE INVENTION

The present invention, in some embodiments thereof, relates to methods and systems of imaging and, more particularly, but not exclusively, to methods and systems of imaging using optical interferometry. Optical interferometry combines two or more light waves in an optical instrument in such a way that interference occurs between them.

Sub-millimeter diameter endoscopes are being examined for usage in many clinical applications that require minimal tissue damage. The harsh size constraints result with reduction of the number of imaging fibers in fiber bundle endoscopes and limit the frame rate of lateral scanning single optical-fiber probes. Recently, a new method termed spectrally-encoded endoscopy (SEE) was introduced, utilizing a single optical fiber and miniature diffractive optics to encode transverse reflections from a sample, see Tearney, G. J., M. Shishkov, and B. E. Bouma, Spectrally encoded miniature endoscopy. Opt. Lett., 27(6): p. 412-414, 2002 and Yelin, D., et al., Three-dimensional miniature endoscopy. Nature, 443 (7113): p. 765-765, 2006, which is incorporated herein by reference. Since rapid lateral scanning is not required, SEE uses slow axis scanning by probe rotation, and is thus capable of high quality imaging through ultra-miniature, single fiber endoscopic probes.

This technique combines optical interferometry, for example in order to extract depth information from the sample. Using low coherence interferometry, allows using a SEE device to capture a three dimensional video imaging of a surface and subsurface tissue structures, as well as Doppler imaging of acoustic vibrations and flow, see Yelin, D., B. E. Bouma, and G. J. Tearney, Volumetric sub-surface imaging using spectrally encoded endoscopy. Optics Express, 16(3): p. 1748-1757, 2008 and 5. Yelin, D., et al., Doppler imaging using spectrally-encoded endoscopy. Optics Express, 16(19): p. 14836-14844, 2008, which are incorporated herein by reference. It should be noted that the imaging depth range of an interferometric SEE system is usually limited by the resolution of the interferometric spectral measurement to a few millimeters.

SEE is usually implemented using a quasi-monochromatic or broad bandwidth light source which illuminates a single optical fiber. At the distal end of the fiber, a diffractive or dispersive optic, such as a single diffraction grating and a single lens, disperses the light across a target object, which is reflected and returns back through the diffractive or dispersive optic and optical fiber. Light from the optical fiber is detected by a wavelength detecting apparatus, such as a spectrometer. By detecting the light intensity as a function of wavelength, the image may be reconstructed. SEE techniques have been described in, for example, U.S. Patent Publication Nos. 2007/0233396 and 2008/0013960.

Conventional endoscopy uses RGB color information as cues to diagnosis. By using wavelength information to encode spatial location, SEE images utilize much of the color information to encode spatial location and therefore important color information may be lost. Accordingly, there may be a need to address and/or overcome at least some of the deficiencies described herein above.

SUMMARY OF THE INVENTION

According to some embodiments of the present invention there are provided a method of adjusting imaging at least a part of an object. The method comprises splitting electromagnetic radiation to first and second portions, propagating the first and second portions, spectrally dispersing the first portion toward the part and the second portion toward a reference element, combining between reflections of the spectrally dispersed first and second portions to produce an interference signal, capturing an image of the part from the interference, and adjusting at least one of a tilt of the image plane and a curvature of the image by changing a deviation between the phase of at least one spectral component of the first portion and the phase of at least one spectral component of the second portion.

Optionally, the capturing comprise presenting the image to a user and receiving instruction for adjusting the at least the image plane therefrom, the adjusting being performed according to the instructions.

Optionally, the propagating is performed in first and second mono-mode optical fibers, the reflections being propagated in the first and second mono-mode optical fibers.

Optionally, the object is an intrabody surface; further comprising conducting the first mono-mode optical fiber in an intrabody tubular lumen so as to image the intrabody surface.

Optionally, the deviation induces a linear chirp in the interference.

According to some embodiments of the present invention there are provided an interferometric imaging device for imaging at least a part of an object. The interferometric imaging device comprises a beam splitter which splits a coherent light to first and second portions, a first waveguide which propagates the first portion toward an imaging spectral dispersion element mounted on its tip so as to spectrally dispersing the first portion onto the part, a second waveguide which propagates the second portion toward a reference element, a spectral dispersion element which forms a deviation between the phase of at least one spectral component of the first portion and the phase of at least one spectral component of the second portion, and a combining element which combines between a first reflection of the first portion and a second reflection of the second portion to produce an interference signal. The spectral dispersion element adjusts at least one of a tilt of the image plane and a curvature of an image formed according to the interference signal by changing the deviation.

Optionally, the spectral dispersion element is a controllable spectral dispersion element.

Optionally, the object is an intrabody surface and the first waveguide and the imaging spectral dispersion element being sized and shaped for being disposed along an intrabody tubular lumen.

Optionally, the interferometric imaging device further comprises a detector which captures an image of the part from the interference.

Optionally, the interferometric imaging device further comprises a coherent light source of generating the coherent light.

Optionally, the interferometric element and the beam splitter are part of a common interferometer.

Optionally, the imaging spectral dispersion element is a grating slanted in relation to a longitudinal axis of the first waveguide.

Optionally, the first and second waveguides are single-mode optical fibers.

Optionally, the interferometric imaging device further comprises a man machine interface for allowing a user to control the controllable spectral dispersion element.

Optionally, the interferometric imaging device further comprises a variable neutral density (ND) filter for filtering the second portion.

Optionally, the spectral dispersion element is placed to spectrally disperse the second portion.

According to some embodiments of the present invention there are provided an interferometric imaging device of imaging at least a part of an object. The interferometric imaging device comprises a light transmission path arrangement which includes a beam splitter set to split electro-magnetic radiation to first and second portions and first and second waveguides for propagating the first and second portions to radiate, respectively, via an imaging spectral dispersion element and a reference element, and a light collection path arrangement which includes an interferometric element to interfere between first and second reflections of the first and spectrally dispersed portions and a detector which captures an image of the part from the interfered reflections. The interferometric imaging device further comprises a spectral dispersion element which changes a deviation between the phase of at least one spectral component of the first portion and the phase of at least one spectral component of the second portion. The deviation set at least one of a tilt of the image plane and a curvature of the image.

According to some embodiments of the present invention there are provided a method of planning an imaging instrument. The method comprises receiving at least one of a predefined image plane tilt and a curvature for an image captured by an interferometric imaging device, calculating a deviation between a phase of at least one spectral component of a first reflection propagated by the interferometric imaging device and a phase of at least one respective spectral component of a second reflection propagated by the interferometric imaging device according to the predefined image plane tilt and the curvature, and instructing a planning of the imaging instrument using the deviation.

Optionally, the interferometric imaging device is set to capture the image by processing an interference signal generated by a combination of the first and second reflections, the first and second reflections being of first and second portions of electro-magnetic radiation, the first portion being emitted via a selected spectral diffraction imaging element toward an imaged object and the second portion being emitted toward a reference element reflecting the electro-magnetic radiation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

The term "method" refers to manners, means, techniques and procedures for accomplishing a given task including, but not limited to, those manners, means, techniques and procedures either known to, or readily developed from known manners, means, techniques and procedures by practitioners of the Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to methods and systems of imaging and, more particularly, but not exclusively, to methods and systems of imaging using optical interferometry.

According to some embodiments of the present invention there is provided an interferometric imaging device, for example an endoscopic or a diagnostic imaging device, with means for adjusting imaging of an object, such as an intrabody surface, by changing the phase of at least one spectral component of light in an interferometric reference and/or imaging arm. The interferometric imaging device includes a beam splitter, which splits a coherent light, optionally received from a coherent light source, such as a laser source, to at least two portions. The device further includes a waveguide which propagates one of the portions toward an imaging spectral dispersion element, such as a diffractive element, for example a grating, which is mounted on its tip so as to spectrally disperse the light portion on the imaged object. The device further includes another waveguide which propagates another portion toward a reference element. The device further includes a spectral dispersion element, optionally controllable, such as a pair of gratings with variable distance between them, which is set to disperse spectrally the first portion and/or the second portion so as to form and/or to change a deviation between the phase of at least one spectral component of the first portion and the phase of at least one respective spectral component of the second portion.

The waveguides are optionally optical fibers. The device further includes an interferometric element which combines between a reflection of the portion which is spectrally dispersed from the imaged object and a reflection of the portion from the reference element to produce an interference signal. The interferometric element is optionally the aforementioned beam splitter. The spectral dispersion element allows adjusting the field of view, for example the image plane and/or the image curvature, and optionally the image curvature, of an image formed according to the interference signal. The adjustment is made by changing a deviation between the phase of at least one spectral component of the portion propagated toward the reference element in relation to the phase of at least one respective spectral component of the portion propagated toward the imaged object. Optionally, the image is captured by a detector, such as a spectrometer, that receives the interference signal. By adjusting the image plane or the image curvature, the total field of view of the imaging device is optimized, or substantially optimized, without adding any mechanical elements that steer or otherwise change the location of the imaging spectral dispersion element in relation to the imaged object. In such a manner, the device may be sized and shaped for being disposed along small intrabody tubular lumens, such as blood vessels and the like. The device also benefits from additional dispersion which compensates for shortcomings of configuration without mechanical scanning mechanism, such as limited imaging angle and image plane curvature.

According to some embodiments of the present invention there is provided a method of imaging an object or any portion thereof. The method is based on receiving and splitting electro-magnetic radiation, such as a coherent illumination, to portions and separately propagating the portions in separate waveguides, such as optical fibers, to a reference element, such as a mirror, and an imaging spectral dispersion element. Now the reflections are combined to produce an interference signal. By capturing the interference signal, an image of the object is captured. The field of view, for example the image plane or curvature, of the captured image may be adjusted, for example by the aforementioned spectral dispersion element, which may be controllable. The adjustment is made by changing a deviation between the phase of one or more spectral components of the portion propagated toward the reference element in relation to the phase of one or more respective spectral components of the portion propagated toward the imaged object.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1A:
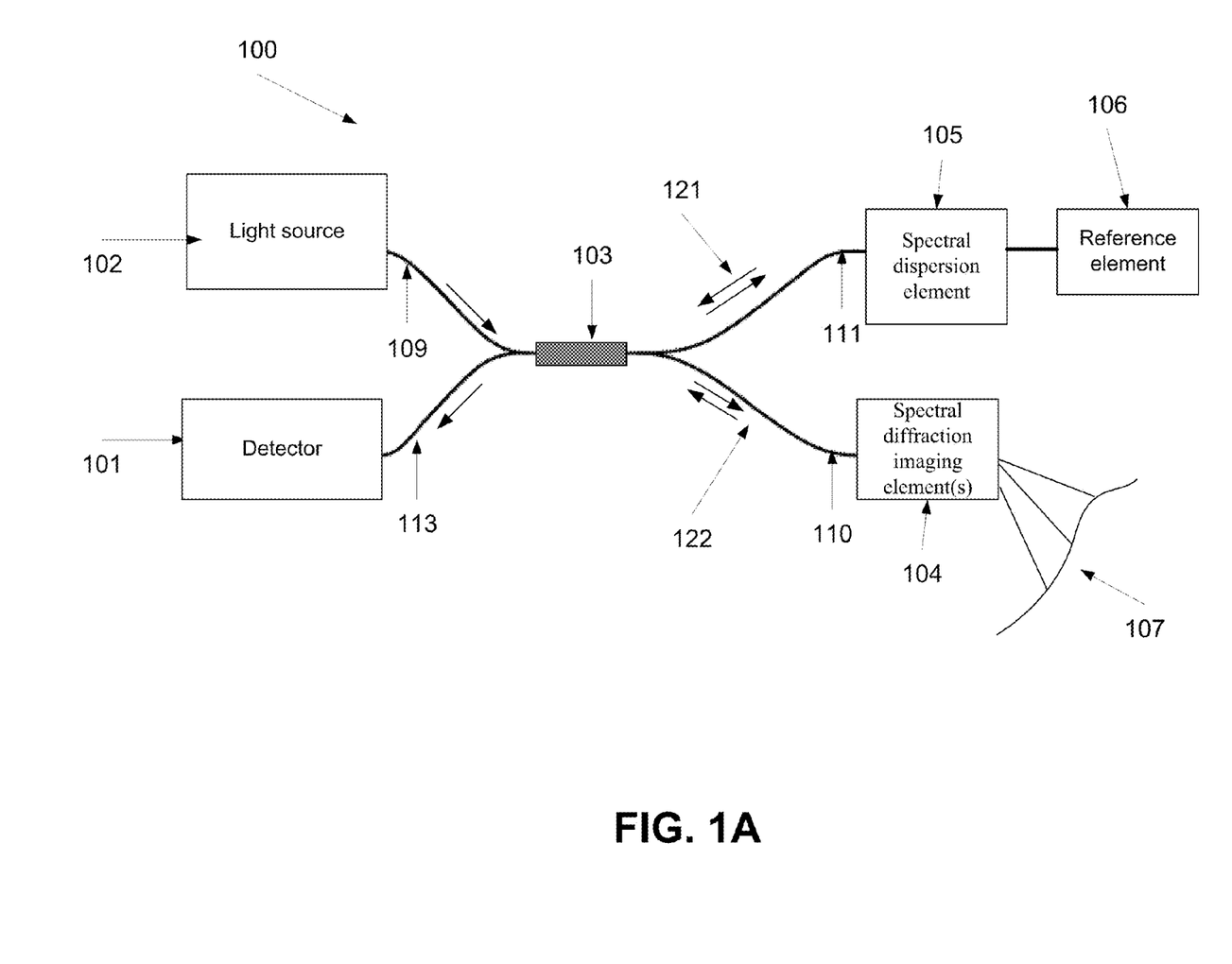
FIG. 1A is a schematic illustration of an interferometric imaging device of imaging one or more objects with an adjustable field of view, according to some embodiments of the present invention.

Reference is now made to FIG. 1A, which is a schematic illustration of an interferometric imaging device 100 of imaging one or more objects with an adjustable field of view, for example an image plane or an image curvature, according to some embodiments of the present invention. The interferometric imaging device 100, which is optionally a spectrally encoded endoscopy device for spectrally-encoded imaging, includes a radiation source, such as a coherent light source 102, for example a broadband light source which transmits, via an optical waveguide 109, such as an optical fiber, electromagnetic radiation, such as coherent light, to a beam splitter 103, such as a fiber coupler, a multilayer interference cube beam splitter, or a half-silvered mirror, for brevity referred to herein as the beam splitter 103. The beam splitter 103 splits the electro-magnetic radiation to first and second portions which respectively propagate in a reference arm 121 and an imaging arm 122. In the imaging arm 122, the first portion is directed via a first optical waveguide 110, such as an optical fiber. The first portion of the electro-magnetic radiation propagates through the first optical fiber 110 to one or more spectral diffraction imaging elements 104, such as one or more gratings. The grating(s) may be slanted in relation to the main optical axis in the Littrow's angle. The grating diffracts the electro-magnetic radiation into spectral components which are angularly different from one another, as further described below. These spectral components propagate toward an imaged object 107, such as an organ, a tissue surface, and/or a surface of any imaged object. As used herein an object means a part of an object or a whole object. In the reference arm, the second portion of the electro-magnetic radiation is directed from the beam splitter 103 toward a second optical waveguide, such as an optical fiber 111. The second portion of the electro-magnetic radiation propagates via the second optical fiber 111, toward a reference element 106, such as a minor.

Figure 1B:
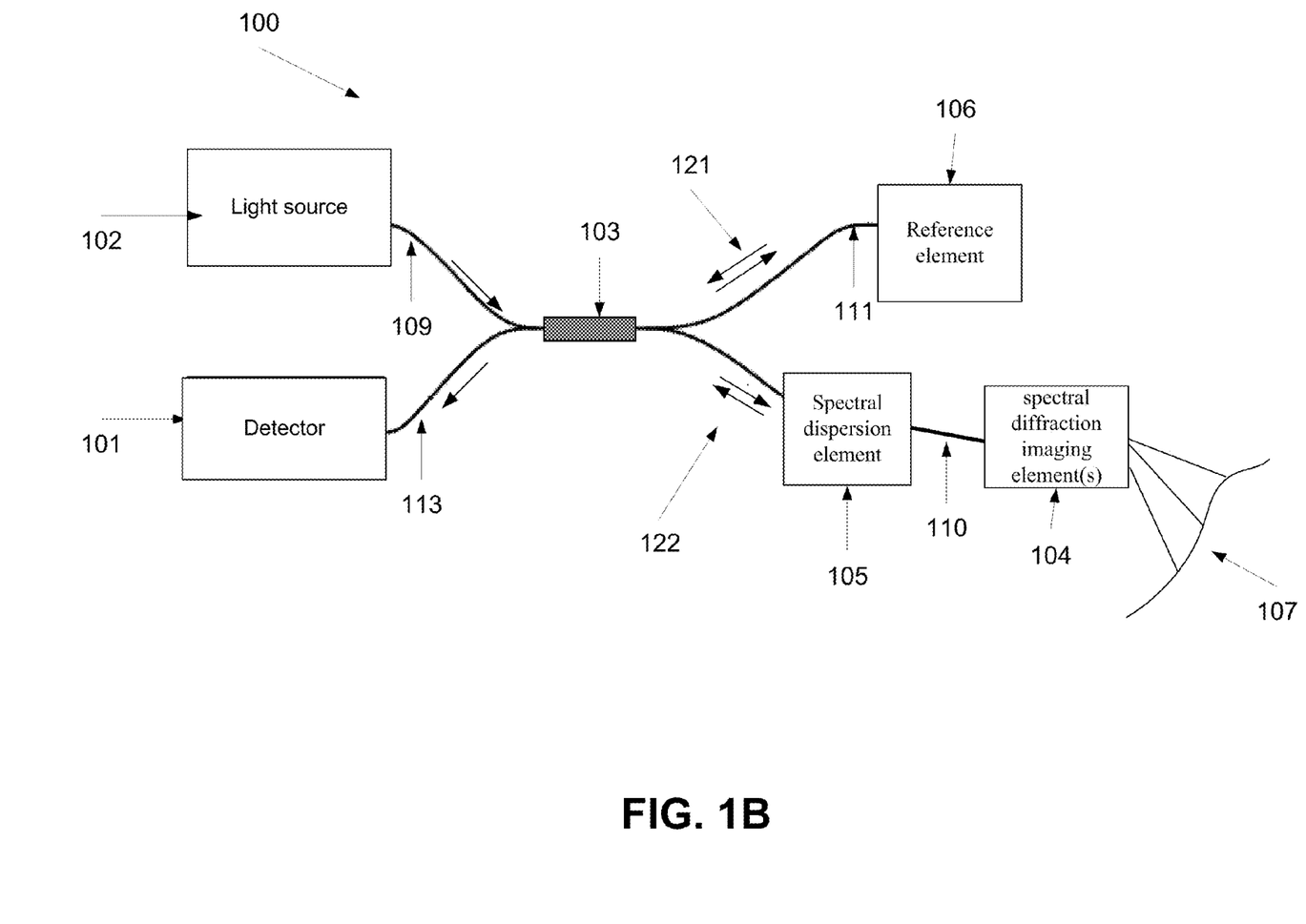
FIG. 1B is a schematic illustration of another interferometric imaging device of imaging one or more objects with an adjustable field of view, according to some embodiments of the present invention.

As depicted in FIG. 1A and in FIG. 1B, the first portion and/or the second portion are propagated via a spectral dispersion element 105, optionally controllable, such as positive and/or negative dispersion control unit. The spectral dispersion element 105 induce changes in the phase of one or more of the spectral components of the portions, including but not limited to linear delay, linear chirp, group velocity dispersion, third order dispersion and higher orders of dispersion.

In FIG. 1A, the spectral dispersion element 105 is placed in front of the reference element and in FIG. 1B the spectral dispersion element 105 is placed between the second optical fiber 110, which is connected to the spectral diffraction imaging element 104, and another waveguide 122 that is connected to beam splitter 103. It should be noted that the spectral dispersion element 105 may be placed in both arm 121, 122 to induce changes in the phase of the spectral components of both portions.

The aforementioned arrangement may be referred to herein as a radiation transmission path or a light transmission path. The interferometric imaging device 100 further includes a radiation collection path such as a light collection path. The radiation collection path of the interferometric imaging device 100 is set to intercept spectrally dispersed (diffracted) radiation from the imaged object 107, which may be referred to herein as a first reflection. The radiation collection path of the interferometric imaging device 100 is further set to intercept reflection from the reference element 106, which may be referred to herein as a second reflection. These reflections are optionally received via the first and second optical fibers 110, 111, at a radiation combiner element. Optionally, the combining element is the beam splitter 103. The signal formed by the combination of the reflections of the spectrally dispersed portions is transferred, optionally via a third optical waveguide, such as an optical fiber 113, to interfere on a detector 101, such as a spectrometer detector array.

Figure 6A:
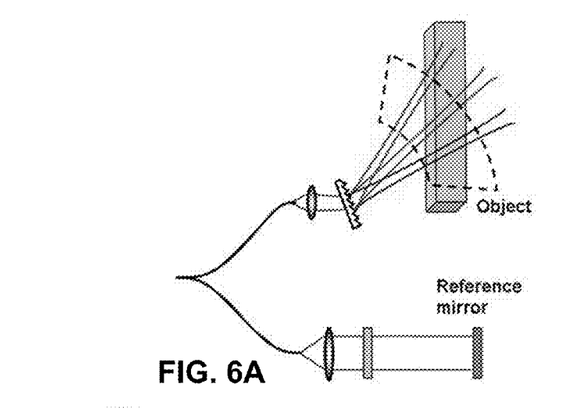
FIG. 6A is schematic illustration of an exemplary interferometric imaging device which propagates portions of light with spectral components having the same phase in both the imaging and reference arms, according to some Embodiments of the present invention.

As outlined above, the spectral dispersion element 105 modifies the electro-magnetic radiation by controlling the phases of the spectral components which are propagated toward the reference element 106 and/or the phases of the spectral components which are propagated toward the spectral diffraction imaging elements 104. The spectral dispersion element 105 may use any dispersive materials and/or spatial light modulator, and may include one or more diffracting elements, such as an arrangement of two gratings, and/or an arrangement of two prisms, to introduce a variable dispersion in the reference arm 121 or in the imaging arm 122. Optionally, the spectral dispersion element 105 is a piece of waveguide that changes the length of the path one of the portions makes in relation to the other. For, example, as shown in FIG. 6A, the spectral dispersion element 105 may be an addition to the waveguide which conducts one of the portions, for example forming a longer optical fiber.

This variable dispersion between the arms 121, 122 is manifested in a change of the imaging plane of the interferometric imaging device 100. The spectral dispersion element 105 may be composed of variable length fibers, various dispersive dielectric materials, spatial light modulator, or any optical configuration which allows controlling or adjusting the spectral phase. Optionally, the dispersion or diffraction of the controllable spectral dispersion element 105 results with independent axial translation of different parts of the field of view of the interferometric imaging device 100. For example, second order dispersion (also referred as group velocity dispersion or linear chirp) in the reference arm 121 adjusts the image plane tilt in the field of view of the image captured by the detector 101 and third order dispersion is used to adjust the respective image field curvature of the image captured by the detector 101.

The embodiment depicted in FIG. 1A allows using the reflections of spectral components of the electro-magnetic radiation from the reference element 106 as a degree of freedom to extend the angular field of view of the interferometric imaging device 100 in a certain position. This extension may be provided without an additional mechanical scanning and/or without changing the dimension of the imaging arm 122, which enable its overall small dimensions. The extension of the field of view compensates for the limited imaging angle and the image plane curvature.

Figure 2:
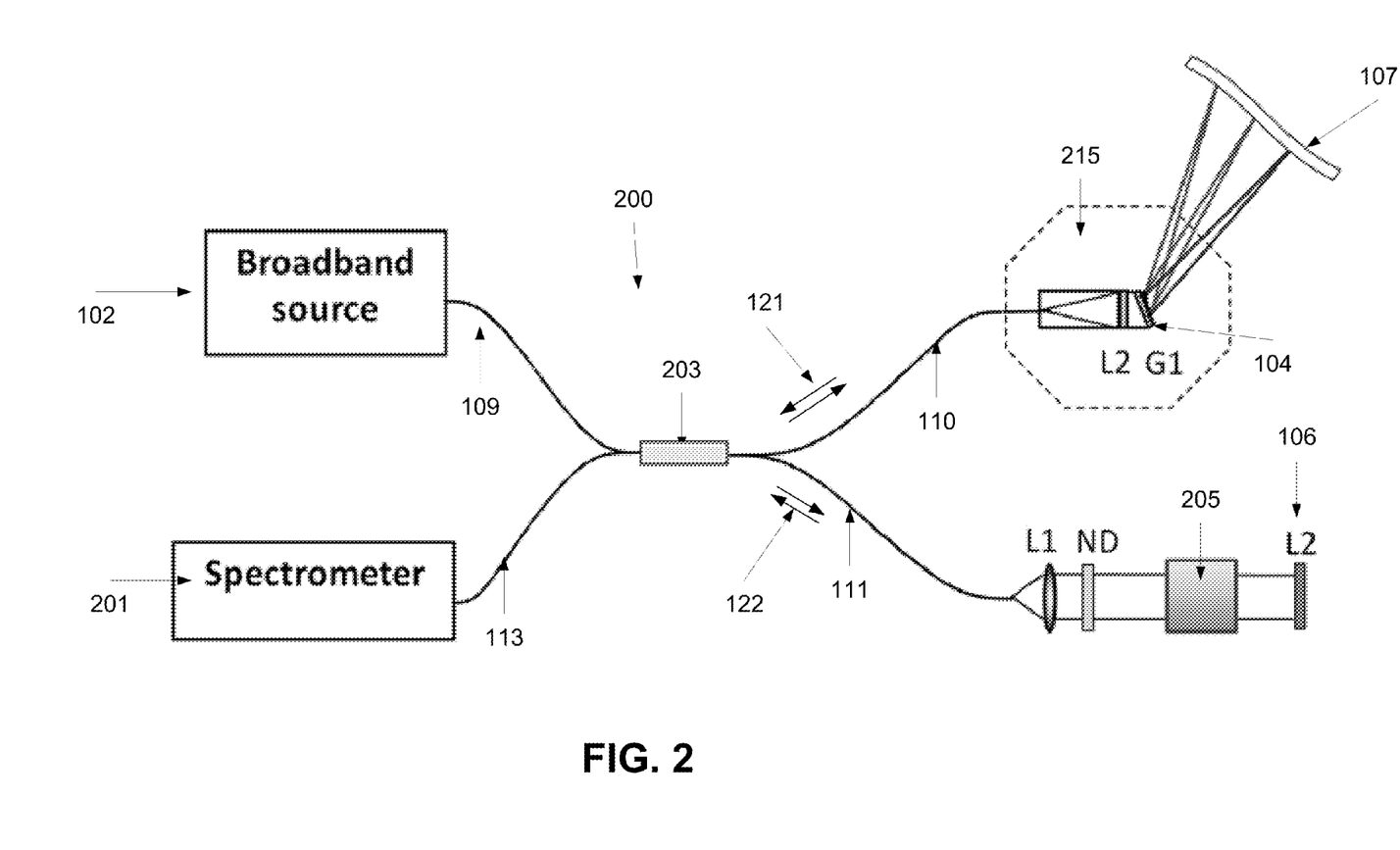
FIG. 2 is a schematic illustration of an exemplary spectrally encoded endoscopy device for spectrally-encoded imaging of intrabody lumens and/or objects according to some embodiments of the present invention.

Reference is now also made to FIG. 2, which is a schematic illustration of an exemplary spectrally encoded endoscopy device 200 for spectrally-encoded imaging of intrabody lumens and/or internal tissues and/or organs, according to some embodiments of the present invention. Area 215 bounds a schematic illustration of a tip of an imaging probe which is optionally used to image intrabody objects, like an endoscope or internal objects of an inspected system, such as a bronchoscope. For example, the imaging probe 215 may be maneuvered to perform rhinoscopy, nasopharyngoscopy, laryngoscopy, and/or nasolaryngoscopy procedures in the body, and/or as a borescope for performing inspection work where the area to be inspected is inaccessible by other means, for example visual inspection of aircraft engines, aeroderivative industrial gas turbines, steam turbines, diesel engines, and/or automotive and truck engines. The coherent source 102, the optical waveguides 109, 110, 111, and 113, and the spectral dispersion element 105 are as described above. However, FIG. 2 further depicts exemplary components of the exemplary spectrally encoded endoscopy device 200. First, in this embodiment, the detector 101 is a spectrometer 201 and the beam splitter 103 is implemented using an optic fiber coupler 203, for example a 50/50 single-mode optical fiber coupler.

In the depicted embodiment, the reference arm 121 consists of a collimating lens (L1), a variable neutral density (ND) filter and a reference minor 106 on a translation stage as a reference element. The imaging arm 122 consists of a lens L2 and a 500-2000 lines/mm transmission diffraction grating (G1) as the spectral diffraction imaging elements 104, for example 1200 lines/mm. In the depicted embodiment, a diffraction grating 104, optionally single, and the lens L2 are placed in the tip of the imaging arm 122 in a configuration which may be referred to herein as a miniature endoscopic probe, optionally defined as described in Yelin, D., et al., Three-dimensional miniature endoscopy. Nature, 443(7113): p. 765-765, 2006, which is incorporated herein by reference. Optionally, the imaging arm 122 is used as a miniature endoscopic probe which may be used for imaging miniature intrabody lumens and/or threaded via lumens of vessels and/or apparatuses with limited apertures. Optionally, the diffraction grating 104 is parallel to the longitudinal axis of the miniature endoscopic probe. Optionally, the diffraction grating 104 is slanted in relation to the longitudinal axis of the miniature endoscopic probe, for example as described above and depicted in FIG. 2. Optionally, the grating is slanted so that the Littrow angle is more than 15°, for example 19°.

Optionally, the electro-magnetic radiation source 102 is a broadband titanium sapphire laser source of Femtolasers Rainbow™ having a bandwidth of 300 nanometer (nm) and a center wavelength of 800 nm and the tip of the imaging arm 122 is a tip of a miniature endoscopic probe where the optical fiber 110, and optionally optical fibers 109, 111, and 113 are single-mode fibers, such as Corning HI 780 fibers, which the specification thereof is incorporated herein by reference, optionally expanded through about 1.8 mm long silica spacer. Optionally, the diameter of the miniature endoscopic probe is 350 μm or even less, since such a miniature endoscopic probe is constructed from a single optical fiber, it is relatively flexible, with a bend radius of approximately 2 mm, except within about 3.5 mm of the rigid distal end.

By using the spectral dispersion element 205, the field of view of the encoded endoscopy device 200, for example the angle of the image plane of the interferometric spectrally encoded endoscopy device 200, may be adjusted before and/or during the imaging of the object 107. This allows imaging organs and/or tissue surfaces which do not overlap with the imaging plane of the grating 104 with regard to a certain spectral component. The spectral dispersion element 205 provides a chromatic dispersion management that allows a three dimensional imaging of the object 107. In such an interferometric spectrally encoded endoscopy device 200, the interference term of the intensity recorded by the spectrometer 201 for a single sample reflector plane (denoted by a line 107 in FIG. 1) with axial location z(k) is given by:

$$I(k)=2Re\{E_R(k)E_S^*(k)\}=2A_R(k)A_S(k)\cos[\Delta\phi(k)]$$    Equation 1 where k denotes a wave vector, $E_R(k)$ and $E_s(k)$ denote complex field amplitudes reflected from the reference and the imaging arms 121, 122 respectively, * denotes a complex conjugate, $A_R(k)$ and $A_s(k)$ denote the field amplitudes reflected from the reference and the imaging arms 121, 122 respectively, and $\Delta\phi(k)=\phi_R(k)-\phi_S(k)$ denotes the spectral phase difference between the reference spectral phase $\phi_R(k)$ and the sample spectral phase $\phi_S(k)$. Since the different wavelengths in the sample arm are dispersed in space, each wavelength accumulates phase according to $\phi_S(k)=k\cdot z(k)$. Since z(k) is a property of the imaging optics design and the relative sample location, in most cases the spectral phases at the reference $\phi_R(k)$ must be adjusted in order to maintain good visibility of the interference patterns. Optionally, $\phi_R(k)$ may be adjusted by allowing the light to pass through a dispersive medium, which is a medium that induces a different angular wavenumber k for different angular frequencies ω: k(ω). Expressing k(ω) as a Taylor series up to the third order around the central frequency $\omega_0$, so that the following is received:

$$k(\omega) = k(\omega_0) + k'(\omega_0)(\omega-\omega_0) + \frac{1}{2}k''(\omega)(\omega-\omega_0)^2 + \frac{1}{6}k'''(\omega)(\omega-\omega_0)^3 + \ldots$$    Equation 2 where the first two terms on the right-hand side of the following equation 2 correspond to a uniform axial shift of the optical delay, and therefore affect only the axial image plane. The third term, often related as group velocity dispersion (GVD), denotes different group delays for different k's, and therefore correspond to a linear tilt of the sample field of view. This tilt z(ω) is linear with ω, and is given by:

$$z(\omega)=z_0+v_g\cdot\Delta k''(\omega)\cdot l_d\cdot(\omega-\omega_0)$$    Equation 3 where $v_g$ denotes a group velocity at $\omega_0$, $\Delta k''$ denotes the difference in the second order Taylor expansion coefficient of k between the sample and the reference arms, and $l_d$ denotes the length of the dispersive path mismatch between the reference and the sample arms. In the absence of dispersion path mismatch ($l_d$=0), the frequency of the interference pattern resulting from a planar reflector at the imaging arm is uniform across the spectrum, and the measured axial image object location is simply $z_0$. If the spectral dispersion element 205 introduces group velocity dispersion in the reference arm 121, for example by using a pair of gratings or by introducing other dispersive media, a linear chirp will be formed in the interference pattern of the combination of the first and second reflections, manifested in a linear tilt of the imaging plane. For example, in order to conduct three dimensional imaging of a surface positioned perpendicular to the miniature endoscopic probe axis, a tilt of about 40° would be required. Such a tilt may be accomplished by introducing group velocity dispersion of 14,000 fs², for example by using a fused silica fiber length of about 40 cm.

Optionally, the spectral dispersion element 205 adjusts the image curvature of the encoded endoscopy device 200. The forth term on the right-hand side of Equation 2 corresponds to a parabolic dependence of the group delay on ω, which affects the curvature of the three-dimensional image plane. Changing k' (the third derivative of k with respect to ω) changes the field of view curvature, and therefore may be used to correct existing undesired field curvature or to effectively image curved surfaces without loss of signal.

The spectral dispersion element 205 allows adjusting the field of view, for example the image plane and/or curvature, without changing the position of the miniature endoscopic probe in the body.

It should be noted that if the arrangement of components is as depicted in FIG. 1B, the spectral dispersion element 105 is placed in a manner that the waveguides 110 and the spectral desperation imaging element 104 can be maneuvered in the body, guided toward a target space for imaging the surface of a target object.

Optionally, this allows adjusting the imaging plane during an endoscopy procedure. In such an embodiment, the controllable spectral dispersion element 105 is connected to a man machine interface (MMI) that allows a user, such as a surgeon or a physician to change the dispersion provided by the controllable spectral dispersion element 105 according to an image which is presented thereto, for example based on the outputs of the detector 101. Such a change may focus and adjust the captured image, optimizing quality of the captured image, and optimizing the field of view. In another embodiment, the controllable spectral dispersion element 105 is connected to an image processing module that processes the image captured by the detector 101 so as to focus it, optimizing quality and/or the field of view. By providing an image with a better quality, the overall procedure time may be reduced.

Figure 3:
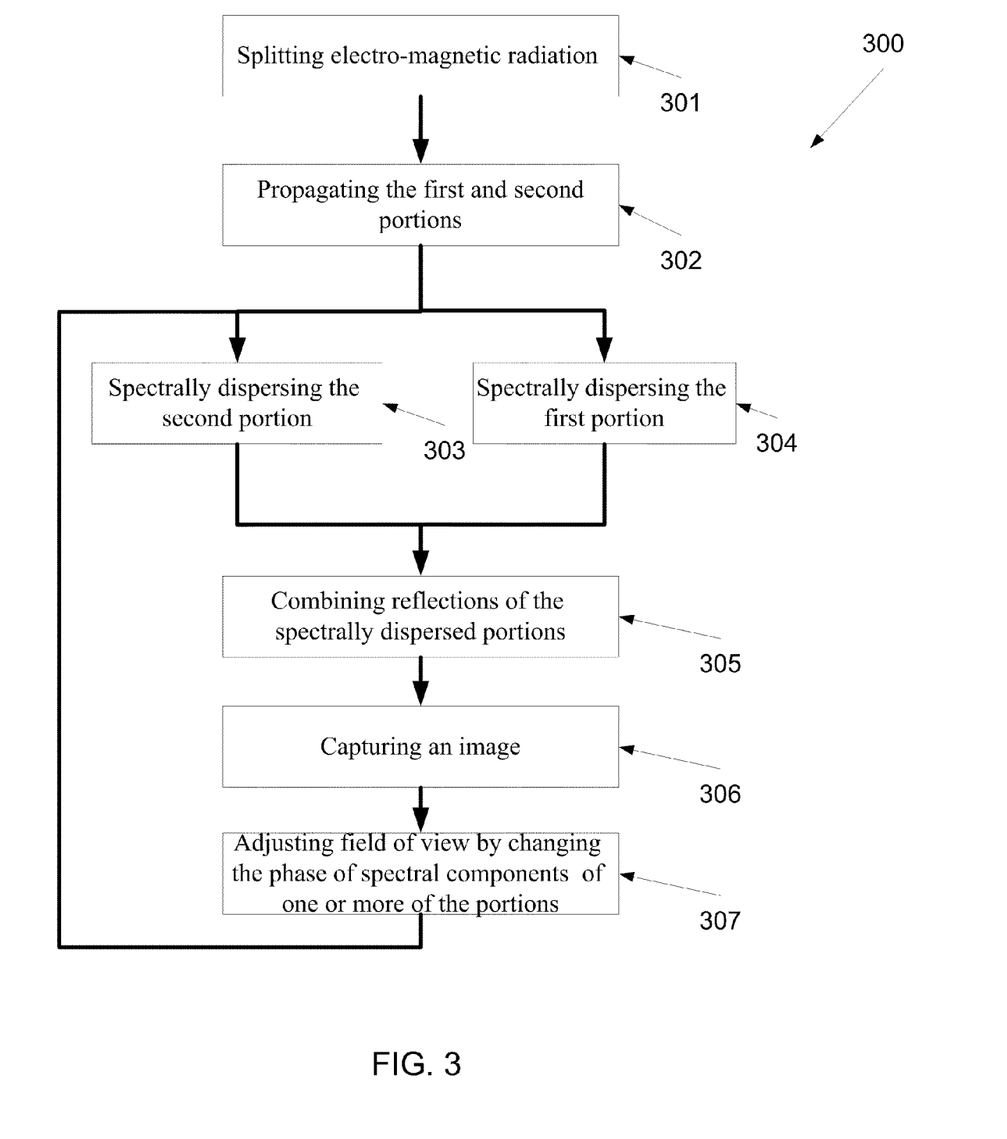
FIG. 3 is a flowchart of a method of adjusting an image plane and/or curvature of an interferometric imaging device, according to some embodiments of the present invention.

Reference is now also made to FIG. 3, which is a method of imaging object or any portion thereof, according to some embodiments of the present invention. First, as shown at 301, an electro-magnetic radiation, such as light emitted by the coherent light source 102, is split to at least first and second portions, for example using the interferometer 103 as described above. Then, as shown at 302, the first and second portions of the split light is propagated in waveguides 111, 110, such as optical fibers, toward the imaging and spectral dispersion elements 105, 104. Now as shown at 303, the first portion is spectrally dispersed, for example using the grating, 104, so as to impinge the image object 107. As shown at 304, the phase of at least one spectral component of the second portion may be changed before it impinges the reference element 106, which is optionally a reference minor. Now, the reflections of from the reference element is conducted, for example using the waveguides 111, 110, towards the interferometer 103 that, as shown at 205, combines between the reflections to produce an interference signal. This signal is passed, optionally the optical fiber 113, to the detector 101 that accordingly, as shown at 306, captures an image of the imaged object 107 from the interference signal. Then, as shown at 307, the field of view of the captured image is adjusted by changing the phase of at least one spectral component of the second portion in relation to the phase of at least one spectral component of the first portion, using the spectral dispersion element 105, for example as described above. As shown at 308, the field of view of the captured image may be repeatedly adjusted during an imaging process. For example, when the encoded endoscopy device 200 is used in an endoscopic procedure for imaging an intrabody organ or surface tissue, the user may use the controllable spectral dispersion element 105 to adjust the field of view. In such a manner, the user receive a wider field of view of the imaged object 107 and can adjust the field of view to focus on slanted surfaces without mechanically change the location of the imaging arm in relation 122 to the object 107.

In another example, a control unit automatically controls the controllable spectral dispersion element 105 to adjust the field of view so as to form a scan pattern and/or an image such as a three dimensional (3D) image.

It should be noted that adjusting the imaging plane of a device having a miniature endoscopic probe with a diffraction grating having large Littrow's angles is substantially beneficial as it allows imaging portions of a plane positioned in parallel, or in perpendicular, to the main longitudinal axis of the miniature endoscopic probe. The solution provided herein above does not require using sophisticated optical designs with additional optical components and/or steering the miniature endoscopic probe by distal bending. In such a manner, a miniature endoscopic probe having an adjustable imaging plane may be provided without widening the diameter or length of the tip of the miniature endoscopic probe.

Optionally, the imaging plane of the encoded endoscopy device 200 is adjusted so as to provide a scanning pattern. In such a manner, the angular field of view of the spectrally encoded endoscopy device 200 from a certain position of the miniature endoscopic probe in a target area, such as an intrabody lumen, is substantially expended.

Figure 5:
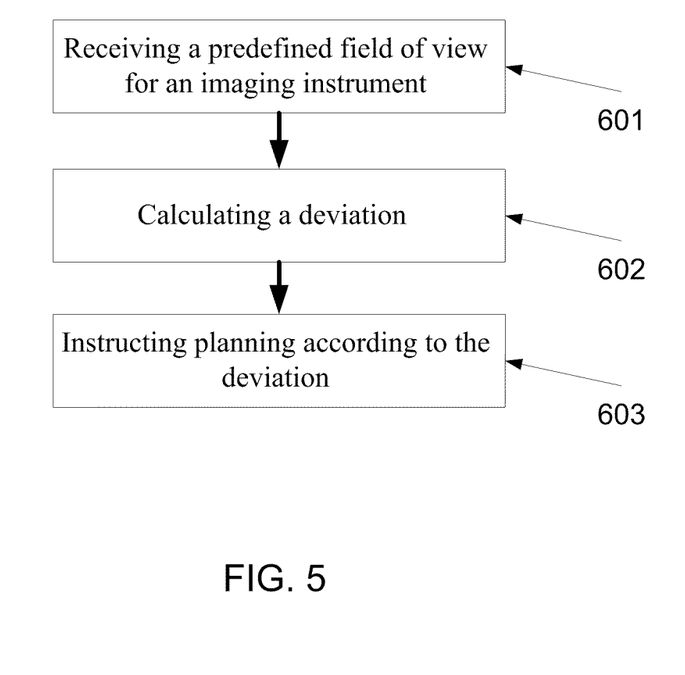
FIG. 5 is a flowchart of a method of planning an imaging instrument for imaging with a predefined field of view or a set of predefined field of views, according to some embodiments of the present invention.

Reference is now made to FIG. 5, which is a flowchart of a method of planning an imaging instrument for imaging with a predefined field of view or a set of predefined field of views, according to some embodiments of the present invention. First, as shown at 601, a predefined field of view for an imaging instrument which captures an image by processing an interference signal generated by a combination of first and second reflections of first and second portions of electromagnetic radiation is received. The field of view may be of a spectrally-encoded imaging device such as a SEE device or any other interferometric imaging device which uses an imaging probe with a selected dispersion imaging element in which a certain portion is emitted via the selected spectral diffraction imaging element toward an imaged object and another portion is emitted toward a reference element that reflects the electro-magnetic radiation.

Now, as shown at 602, a deviation between a phase of one or more spectral components of the first reflection and a phase of one or more respective spectral components of the second reflection is calculated according to the requested field of view. The calculation may be performed using the aforementioned equations and the derivatives thereof.

This allows, as shown at 603, instructing a planning of the imaging instrument according to the calculated deviation. The instructions may define a difference between the lengths of the optical fibers used to propagate the first and second portions, a spectral dispersion element which is placed to change or adjust the phase of the spectral components of one or more of the portions, the composition of waveguides, and/or the setting of an element that set a deviation between the phase of spectral components of the first reflection and the phase of respective spectral components of the second reflection. The method may be implemented by a computing unit, such a server, a central processing unit (CPU) based computing unit, a cloud computing unit and the like. Optionally, the method is used for planning imaging instruments such as an endoscope, a boroscope, a fiberscope, and/or any interferometric imaging device and/or system.

It is expected that during the life of a patent maturing from this application many relevant devices, systems, and methods will be developed and the scope of the term a detector, a spectrometer, an optical fiber, and an endoscope is intended to include all such new technologies a priori.

As used herein the term "about" refers to ±10.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Reference is now made to the following example, which together with the above descriptions, illustrates some embodiments of the invention in a non limiting fashion.

In this example, an exemplary system, set as depicted in FIG. 2, that consists of a broadband titanium sapphire laser source (Femtolasers Rainbow, 300 nm bandwidth, 800 nm center wavelength) coupled into a 50/50 single-mode optical fiber coupler within a Michelson interferometer. The reference arm consists of a collimating lens (L1), a variable ND filter and a minor on a translation stage; the imaging arm consists of a collimating lens (L2), a 1200 lines/mm transmission diffraction grating (G1) and optionally a focusing lens (not shown, f=50 mm). In order to demonstrate a change in the field of view, an image plane tilt, we imaged a minor surface in the imaging arm. An interferogram of the reflected spectra from the imaged object and the reference arm was detected by a custom spectrometer, comprised of a collimating lens, a 1800 lines/mm transmission diffraction grating, a focusing lens (Nikon, AF Nikkor 85 mm f/1.8D) and a high-speed line camera (Basler Sprint spL4096).

Figure 4:
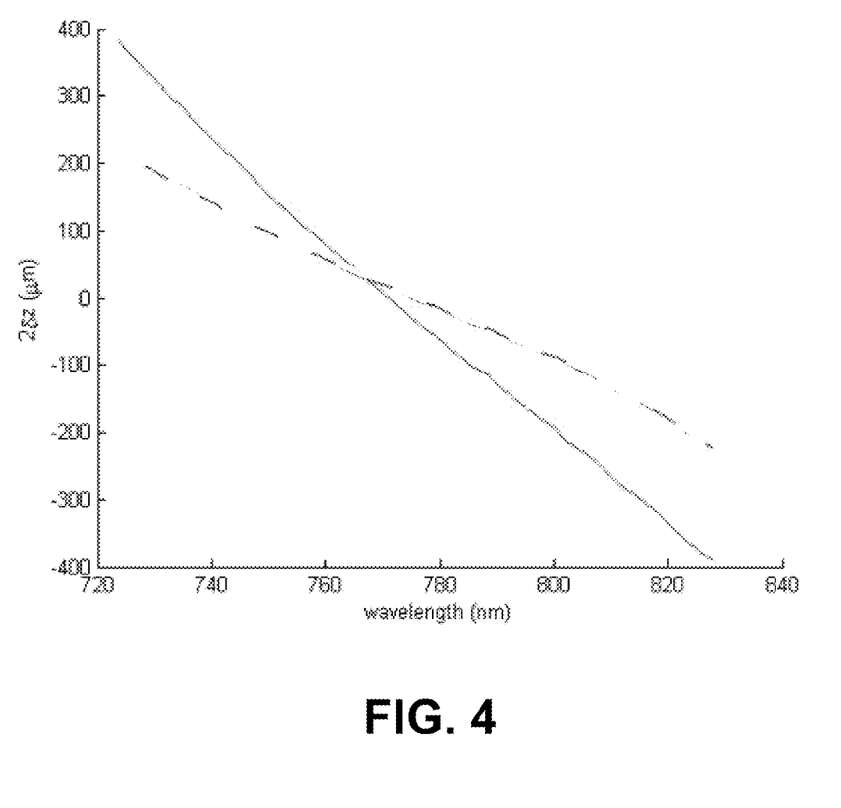
FIG. 4 is a graph that depicts a relative angle of an image plane with (continuous line) and without (dashed line) an exemplary dispersion created by a 4.5 cm long water cell positioned in a reference arm of an interferometric imaging device set according to some embodiments of the present invention.

In order to experimentally demonstrate linear tilt of the image plane of the exemplary system, dispersion mismatch was obtained by positioning a 4.5 cm long distilled water (k"=248 $fs^2$ cm-1, see van Engen, A. G., S. A. Diddams, and T. S. Clement, Dispersion Measurements of Water with White-Light Interferometry. Appl. Opt., 37: p. 5679-5686, 1998, which is incorporated herein by reference) cell in the reference arm. Two spectra of the exemplary system were acquired, with and without the water cell in the reference arm, and a short-time Fourier transform of the interference pattern was calculated using a Gaussian window. The calculated depth profiles are shown in FIG. 4, depicting approximately 0.38° angle difference in the image planes. For this estimation, only the central 110 nm portion of the spectrum was used. Deviations from flat surface in the measurements may be attributed to spectrometer nonlinearities in the wavelength measurement. Assuming that the optical fiber lengths in both arms were identical, and neglecting the finite width of the water cell walls, we expect image plane tilt of approximately 0.4° compared with dispersion matched configuration, which is in good agreement with the experimental result. For practical exemplary system applications, such as spectrally-encoded endoscopy applications, the imaged object transverse field of view is 1-2 mm, approximately 15 times smaller than the field of view of the exemplary system. As a result, such a water cell would tilt the image plane of the miniature endoscopic probe by approximately 6°.

Figure 6B:
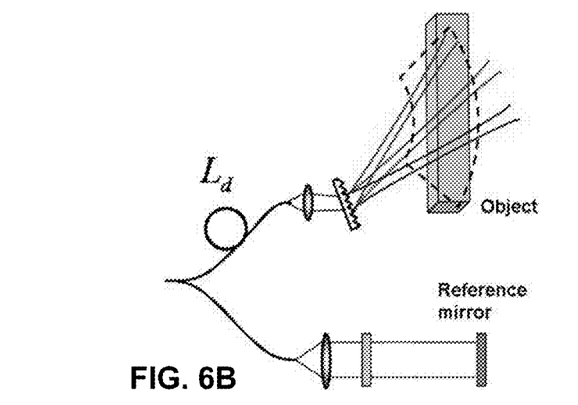
FIG. 6B is schematic illustration of another exemplary interferometric imaging device which propagates portions of light having spectral components with different phases in the imaging and reference arms, according to some embodiments of the present invention.
Figure 6C:
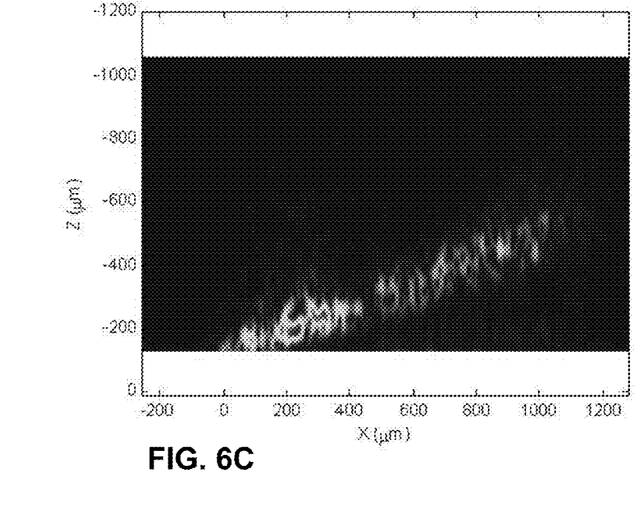
FIGS. 6C and 6D are images of a reflection captured by the spectrometer of the exemplary interferometric imaging devices of FIGS. 6A and 6B respectively.
Figure 6D:
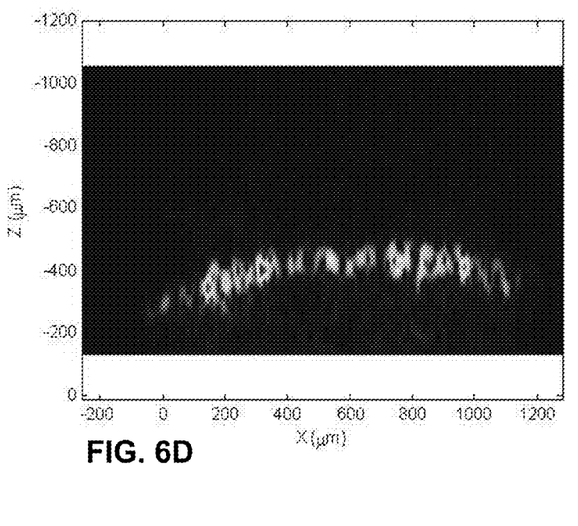

Reference is now also made to FIG. 6A which is schematic illustration of an exemplary interferometric imaging device having imaging and reference arms for propagating portions of light with spectral components having the same phase and to FIG. 6B which is schematic illustration of another exemplary interferometric imaging device having imaging and reference arms for propagating portions of light having spectral components with different phases. The exemplary interferometric imaging devices are optionally as depicted in FIGS. 1A and 1B, without the spectral dispersion element 105. In FIG. 6A, the length of the waveguide in the reference arm is identical to the length of the waveguide in the imaging arm. However, In FIG. 1B, the length of the waveguide in the reference arm is shorter than the length of the waveguide in the imaging arm. This length difference induces a change in the phase of one or more spectral components of the first portion in relation to the phase of one or more spectral components of the second portion. The group delay component of the phase change (correspond to k') cause a uniform axial shift in the field of view and was compensated by shifting the reference mirror (106). The change in second and third orders of the spectral phase affect the image plane tilt and curvature, respectively, of the image captured by the exemplary interferometric imaging device of FIG. 6B. This effect is depicted in the angle of the light which is dispersed toward the imaged object, as seen in FIGS. 6A and 6B and in FIGS. 6C and 6D are images of a reflection captured by the spectrometer of the exemplary interferometric imaging devices of FIGS. 6A and 6B respectively.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of adjusting imaging at least a part of an object, comprising:
   splitting electro-magnetic radiation to first and second portions;
   propagating said first portion toward said part and said second portion toward a reference element;
   spectrally diffracting said first portion using a spectral diffraction imaging element;
   spectrally dispersing at least one of said first portion and said second portion using a spectral dispersion element;
   combining between reflections of said spectrally diffracted first portion and said second portion to produce an interference signal;
   capturing an image of the part from said interference signal; and
   presenting said image to a user;
   receiving from a user instructions to optimize the quality of said image;
   using said spectral dispersion element to perform:
   an adjustment of a second order dispersion of at least one of said first portion and said second portion to change a tilt of an image plane in the field of view of said part, or
   an adjustment of a third order dispersion of at least one of said first portion and said second portion to change a curvature of said image by changing, according to said user instructions;
   wherein said adjustment is made by changing a deviation between the phase of at least one spectral component of said first portion and the phase of at least one spectral component of said second portion.

2. The method of claim 1, wherein said propagating is performed in first and second mono-mode optical fibers, said reflections being propagated in said first and second mono-mode optical fibers.

3. The method of claim 2, wherein the object is an intrabody surface; further comprising conducting said first mono-mode optical fiber in an intrabody tubular lumen so as to image said intrabody surface.

4. The method of claim 1, wherein said deviation induces a linear chirp in said interference.

5. An interferometric imaging device for imaging at least a part of an object, comprising:
   a beam splitter which splits a coherent light to first and second portions;

a first waveguide which propagates said first portion toward an imaging spectral diffraction imaging element mounted on its tip so as to spectrally diffracting said first portion onto the part;

a second waveguide which propagates said second portion toward a reference element;

a combining element which combines between a first reflection of said first portion and a second reflection of said second portion to produce an interference signal;

a man machine interface (MMI) which presents to a user an image formed according to said interference signal and receives from said user instructions to optimize the quality of said image;

a spectral dispersion element which changes a deviation between the phase of at least one spectral component of said first portion and the phase of at least one spectral component of said second portion according to said user instructions;

to adjust:

a second order dispersion of at least one of said first portion and said second portion thereby changing at tilt of an image plane in the field of view of said part, or a third order dispersion of at least one of said first portion and said second portion thereby changing a curvature of said image.

6. The interferometric imaging device of claim 5, wherein said spectral dispersion element is a controllable spectral dispersion element.

7. The interferometric imaging device of claim 5, wherein said object is an intrabody surface and said first waveguide and said imaging spectral dispersion element being sized and shaped for being disposed along an intrabody tubular lumen.

8. The interferometric imaging device of claim 5, further comprising a detector which captures an image of the part from said interference.

9. The interferometric imaging device of claim 5, further comprising a coherent light source of generating said coherent light.

10. The interferometric imaging device of claim 5, wherein said combining element and said beam splitter are part of a common interferometer.

11. The interferometric imaging device of claim 5, wherein said imaging spectral dispersion element is a grating slanted in relation to a longitudinal axis of the first waveguide.

12. The interferometric imaging device of claim 5, wherein said first and second waveguides are single-mode optical fibers.

13. The interferometric imaging device of claim 5, further comprising a variable neutral density (ND) filter for filtering said second portion.

14. The interferometric imaging device of claim 5, wherein said spectral dispersion element is placed to spectrally disperse said second portion.

15. An interferometric imaging device of imaging at least a part of an object, comprising:

a light transmission path arrangement which includes a beam splitter set to split electro-magnetic radiation to first and second portions and first and second waveguides for propagating said first and second portions to radiate, respectively, said part and a reference element; and a light collection path arrangement which includes an interferometric element to interfere between first and second reflections of said first and second portions and a detector which captures an image of the part from said interfered reflections;

a man machine interface (MMI) which presents said image to a user and receives from a user instructions to optimize the quality of said image;

a spectral diffraction imaging element for spectrally diffracting said first portion; and a spectral dispersion element which changes a deviation between the phase of at least one spectral component of said first portion and the phase of at least one spectral component of said second portion according to said user instructions to adjust:

a second order dispersion of at least one of said first portion and said second portion thereby changing a tilt of an image plane in the field of view of said part, or a third order dispersion of at least one of said first portion and said second portion thereby changing a curvature of said image.

16. The method of claim 1, wherein said user instructions comprise image focusing instructions.

* * * * *